(12) United States Patent
Yoshida et al.

(10) Patent No.: US 7,915,819 B2
(45) Date of Patent: Mar. 29, 2011

(54) MAGNESIUM OXIDE-CONTAINING BARRIER LAYER FOR THICK DIELECTRIC ELECTROLUMINESCENT DISPLAYS

(75) Inventors: Isao Yoshida, Ibaraki (JP); Hiroki Hamada, Hirakata (JP); Joe Acchione, Caledon (CA); Yongbao Xin, Mississauga (CA); San Yu, Brampton (CA)

(73) Assignees: iFire IP Corporation, Oakville, Ontario (CA); Sanyo Electric Co., Ltd., Moriguchi-Shi, Osaka (JP)

( * ) Notice: Subject to any disclaimer, the term of this patent is extended or adjusted under 35 U.S.C. 154(b) by 720 days.

(21) Appl. No.: 11/403,708

(22) Filed: Apr. 13, 2006

(65) Prior Publication Data

US 2006/0250082 A1 Nov. 9, 2006

Related U.S. Application Data

(60) Provisional application No. 60/671,460, filed on Apr. 15, 2005.

(51) Int. Cl.
*H05B 33/14* (2006.01)
(52) U.S. Cl. ....................... 313/509; 313/503
(58) Field of Classification Search .......... 313/498–512; 315/169.1, 169.3; 428/690–691, 917; 438/26–29, 438/34, 82; 257/40, 72, 98–100, 642–643, 257/759; 427/58, 64, 66, 532–535, 539; 445/24–25
See application file for complete search history.

(56) References Cited

U.S. PATENT DOCUMENTS

| 4,429,303 | A | | 1/1984 | Aboelfotoh |
| 4,547,702 | A | | 10/1985 | Schrank |
| 4,849,674 | A | * | 7/1989 | Cherry et al. ................ 313/509 |
| 5,190,333 | A | | 3/1993 | Minichan et al. |
| 5,319,282 | A | | 6/1994 | Winsor |
| 5,432,015 | A | | 7/1995 | Wu et al. |
| 5,466,990 | A | | 11/1995 | Winsor |
| 5,905,336 | A | * | 5/1999 | Van Hal et al. ............... 313/497 |
| 6,023,258 | A | | 2/2000 | Kuriyama et al. |
| 6,087,766 | A | | 7/2000 | Janning |
| 6,111,353 | A | | 8/2000 | Janning |
| 6,147,456 | A | | 11/2000 | Janning |
| 6,207,302 | B1 | * | 3/2001 | Sugiura et al. ................ 428/690 |
| 6,414,442 | B1 | | 7/2002 | Janning |
| 6,469,451 | B2 | * | 10/2002 | Mori .......................... 315/169.4 |
| 7,427,367 | B2 | * | 9/2008 | Stiles et al. ............ 252/301.4 S |
| 2001/0015619 | A1 | * | 8/2001 | Nagano et al. ................ 313/506 |
| 2002/0005506 | A1 | * | 1/2002 | Yano et al. ............ 252/301.4 R |
| 2002/0031685 | A1 | * | 3/2002 | Yano et al. ..................... 428/690 |

(Continued)

FOREIGN PATENT DOCUMENTS

JP 10162743 A * 6/1998

(Continued)

*Primary Examiner* — Nimeshkumar D Patel
*Assistant Examiner* — Donald L Raleigh
(74) *Attorney, Agent, or Firm* — Fay Sharpe LLP

(57) ABSTRACT

A novel laminate is provided to improve the operating stability of thioaluminate based phosphors used in ac thick film dielectric electroluminescent displays. The novel structure comprises a rare earth activated alkaline earth thioaluminate phosphor thin film layer and a magnesium oxide or magnesium oxide containing layer provided directly adjacent and in contact with the bottom of the phosphor thin film layer. The invention is particularly applicable to phosphors used in electroluminescent displays that employ thick dielectric layers subject to high processing temperatures to form and activate the phosphor films.

47 Claims, 5 Drawing Sheets

U.S. PATENT DOCUMENTS

| | | | |
|---|---|---|---|
| 2002/0192501 A1* | 12/2002 | Yano et al. | 428/690 |
| 2003/0073042 A1 | 4/2003 | Cernigliaro et al. | |
| 2004/0159903 A1 | 8/2004 | Burgener et al. | |
| 2004/0161631 A1* | 8/2004 | Liu et al. | 428/690 |
| 2004/0170865 A1* | 9/2004 | Hamada et al. | 428/690 |
| 2005/0116638 A1* | 6/2005 | Chung et al. | 313/512 |
| 2005/0156506 A1* | 7/2005 | Chung et al. | 313/495 |
| 2005/0249971 A1* | 11/2005 | Li et al. | 428/690 |
| 2006/0017381 A1* | 1/2006 | Xin et al. | 313/509 |
| 2007/0090374 A1* | 4/2007 | Ting et al. | 257/81 |

FOREIGN PATENT DOCUMENTS

| | | |
|---|---|---|
| WO | WO 2004/036961 A2 | 4/2004 |

* cited by examiner

MAGNESIUM OXIDE-CONTAINING BARRIER LAYER FOR THICK DIELECTRIC ELECTROLUMINESCENT DISPLAYS

This application claims the benefit of U.S. Provisional Application Ser. No. 60/671,460, filed Apr. 15, 2005.

FIELD OF THE INVENTION

The invention is directed to improving the luminance and operating stability of phosphors used for full color ac electroluminescent displays employing thick film dielectric layers with a high dielectric constant. More specifically, the invention provides magnesium-oxide containing layers in contact with the phosphor layer to prevent phosphor degradation.

BACKGROUND OF THE INVENTION

The thick film dielectric structure provides for superior resistance to dielectric breakdown as well as a reduced operating voltage as compared to thin film electroluminescent (TFEL) displays, as exemplified by U.S. Pat. No. 5,432,015. The thick film dielectric structure also enhances the amount of charge that can be injected in to the phosphor film to provide greater luminosity than can be realized from TFEL displays. Full colour thick dielectric electroluminescent displays are described for example in the Applicant's co-pending International Patent Application WO 2004/036961. These displays employ high luminance blue phosphor materials to directly illuminate blue sub-pixels and colour conversion materials to down-convert the blue light to red or green light for the red and green sub-pixels. A preferred blue phosphor material for use in thick film dielectric electroluminescent displays is europium activated barium thioaluminate.

Thick film electroluminescent displays fully meet the luminosity and colour spectrum capability of cathode ray tube (CRT) based displays. However, the operating stability still falls short of that provided by CRTs.

Magnesium oxide layers have been used in organic electroluminescent displays to protect organic electroluminescent displays from ambient moisture and magnesium oxide layers have been used in thin film structures for displays such as those described in U.S. Pat. Nos. 4,429,303, 4,547,702, 4,849,674, 5,319,282, 5,466,990, 5,190,333, 6,087,766, 6,023,258, 6,111,353, 6,207,302, 6,147,456, 6,414,442, and U.S. Patent Applications 2003/0073042 and 2004/0159903, but have not been reported for use in inorganic electroluminescent displays to provide chemical isolation between the inorganic phosphor film and adjacent dielectric layers, particularly thick film dielectric layers that are chemically complex and have a tendency to react with adjacent phosphor layers during display fabrication and subsequently during display operation.

Alumina layers have been used to provide a measure of chemical isolation between thick dielectric layers and phosphor layer, however, their effectiveness is reduced when the phosphor is deposited by sputtering rather than by evaporation. The phosphor sputtering process may subject the underlying thin dielectric layer with bombardment by energetic ions that may cause deterioration of the thin dielectric layer. Magnesium oxide has been used to coat phosphor powders used in colour plasma displays to protect the phosphor materials from the harsh environment of the UV-emitting pixel plasma.

There remains a need to provide further improvements to thick film dielectric electroluminescent displays that will further improve the luminance of phosphors provided therein and also extend their operating life with minimal degradation.

SUMMARY OF THE INVENTION

The present invention provides an improved operating life to a thin film alkaline earth thioaluminate phosphor doped with a rare earth activator species. The improved operating life is achieved by providing a magnesium oxide or magnesium oxide containing barrier layer directly in contact with the bottom portion of the phosphor. The magnesium oxide or magnesium oxide containing barrier layer is therefore positioned between the thick dielectric structure of the display and the phosphor layer so that it is in contact with the phosphor layer. In other aspects of the invention a second magnesium oxide or magnesium oxide containing barrier layer may be provided directly adjacent a top portion of the phosphor in proximity to the upper electrode used in the electroluminescent display.

The magnesium oxide or magnesium oxide containing layer of the invention acts as a barrier to chemical species that may cause a reduction in the luminance of the phosphor material.

In aspects of the invention, the magnesium oxide or magnesium oxide containing layer may comprise an additional element selected from, but not limited to, barium, aluminum and mixtures thereof.

According to an aspect of the present invention there is provided an improved phosphor structure for a thick dielectric film electroluminescent device, said structure comprising;
  a rare earth activated alkaline earth thioaluminate phosphor thin film layer;
  a magnesium oxide or magnesium oxide containing layer provided directly adjacent a bottom of said phosphor thin film layer.

According to an aspect of the present invention there is provided an improved phosphor structure in a thick dielectric film electroluminescent device, said structure comprising;
  a rare earth activated alkaline earth thioaluminate phosphor thin film layer;
  a magnesium oxide or magnesium oxide containing layer provided directly adjacent a bottom of said phosphor thin film layer.

According to still another aspect of the present invention is a phosphor laminate for use in a thick film dielectric electroluminescent display, said laminate comprising;
  (a) a rare earth activated alkaline earth thioaluminate phosphor thin film layer;
  (b) a magnesium oxide or magnesium oxide containing layer provided directly adjacent the bottom and in contact with said phosphor thin film layer; and
  (c) a thick film dielectric layer adjacent a bottom surface of said magnesium oxide or magnesium oxide containing layer.

According to still another aspect of the present invention is a phosphor laminate in a thick film dielectric electroluminescent display, said laminate comprising;
  (a) a rare earth activated alkaline earth thioaluminate phosphor thin film layer;
  (b) a magnesium oxide or magnesium oxide containing layer provided directly adjacent the bottom and in contact with said phosphor thin film layer; and
  (d) a thick film dielectric layer adjacent a bottom surface of said magnesium oxide or magnesium oxide containing layer.

In aspects, the phosphor laminate may further comprise a layer of barium titanate between (b) and (c). In still further aspects of the invention a layer of silicon nitride, aluminum nitride and/or alumina can be provided directly adjacent and in contact with the surface of the magnesium oxide or magnesium oxide containing layer that is not in contact with the phosphor layer. In still other aspects, the phosphor laminate may further comprise a further layer of barium tantalate in between the barium titanate and aluminum oxide layers.

According to still another aspect of the present invention is a phosphor laminate for a thick dielectric film electroluminescent device, said laminate comprising:
- a rare earth activated barium thioaluminate phosphor thin film layer;
- a magnesium oxide or magnesium oxide containing layer provided directly adjacent and in contact with a bottom of said phosphor thin film layer; and
- a thick film dielectric layer adjacent said magnesium oxide or magnesium oxide layer.

According to still a further aspect of the present invention is a thick film dielectric electroluminescent device comprising:
- a europium activated barium thioaluminate phosphor;
- a layer of magnesium oxide or magnesium oxide containing layer directly adjacent a bottom surface of the phosphor; and
- a thick film dielectric layer adjacent said layer of magnesium oxide or magnesium oxide containing layer.

According to another aspect of the present invention is a thick film dielectric electroluminescent device comprising:
- a thioaluminate phosphor layer of formula $AB_xC_{1+3x/2}$:RE where A is at least one of Mg, Ca, Sr or Ba, B is at least one of Al, Ga or In and C is least one of S or Se, and $2 \leq x \leq 4$ and RE is selected from cerium and europium; and
- a magnesium oxide or magnesium oxide containing layer provided directly adjacent a bottom surface of said phosphor layer.

According to yet a further aspect of the present invention is a thick film dielectric electroluminescent device comprising:
- a rigid heat resistant substrate;
- an electrode layer adjacent a top surface of said substrate;
- a thick film dielectric layer adjacent said electrode layer;
- a layer containing or consisting of magnesium oxide adjacent said thick film dielectric layer; and
- a phosphor layer directly in contact with said layer containing or consisting of magnesium oxide.

In further aspects, the device may comprise an optional barium titanate layer adjacent the thick film dielectric layer. In still further aspects the device may comprise a layer of silicon nitride, aluminum nitride and/or alumina directly adjacent and in contact with the surface of the magnesium oxide or magnesium oxide containing layer that is not in contact with the phosphor layer. Still in other aspects, the device may further comprise a layer of barium tantalate in between the aluminum nitride and/or alumina layer and the barium titanate layer.

Other features and advantages of the present invention will become apparent from the following detailed description. It should be understood, however, that the detailed description and the specific examples while indicating embodiments of the invention are given by way of illustration only, since various changes and modifications within the spirit and scope of the invention will become apparent to those skilled in the art from said detailed description.

BRIEF DESCRIPTION OF THE DRAWINGS

The present invention will become more fully understood from the detailed description given herein and from the accompanying drawings, which are given by way of illustration only and do not limit the intended scope of the invention.

DETAILED DESCRIPTION OF THE INVENTION

The present invention is a thin film thioaluminate based phosphor layer where the phosphor thin film layer is in direct contact with magnesium oxide or magnesium oxide containing layer. As such, the magnesium oxide or magnesium oxide containing layer is situated between the phosphor thin film layer and a dielectric layer.

In aspects of the invention, the thin film thioaluminate based phosphor layer is used in or provided for a thick film dielectric electroluminescent device (display). As such the magnesium oxide or magnesium oxide containing layer is situated between the phosphor thin film layer and the thick film dielectric layer.

Figure 1:
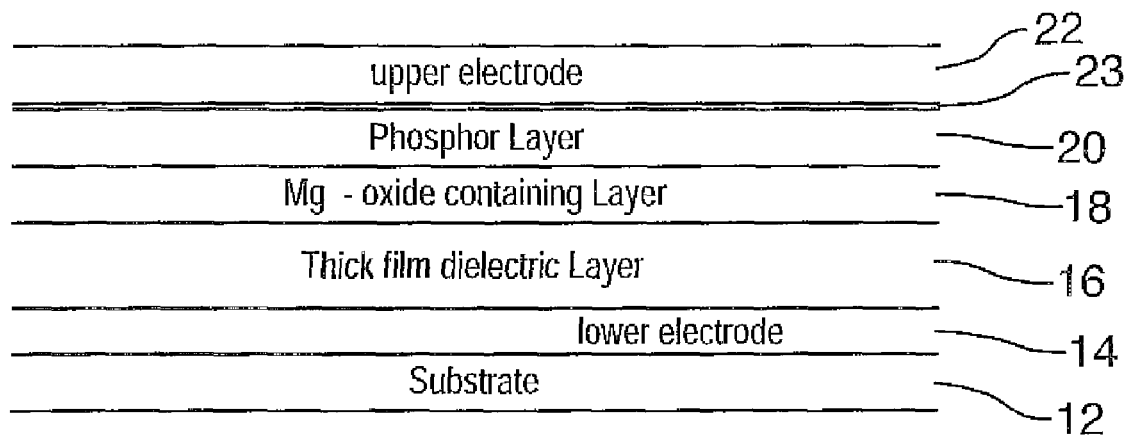
FIG. 1 shows a schematic drawing of the cross section of a thick dielectric electroluminescent device showing the position of a magnesium oxide layer of the present invention.

FIG. 1 shows a schematic drawing of the cross section of one embodiment of such a device represented, in general, by reference numeral 10. The device 10 comprises a basic structure of, in sequence, a substrate 12, an electrically conductive film layer to form the lower electrode 14, the thick film dielectric layer 16, the magnesium oxide or magnesium oxide containing layer 18, the phosphor thin film layer 20, an upper thin film dielectric layer 23 typically of aluminum nitride and an optically transparent but electrically conductive film layer to form the upper electrode 22 in the structure. The lower electrode 14 is typically gold or silver and the upper electrode 22 is a transparent electrically conductive layer, typically, an oxide such as indium tin oxide (ITO). The combination of the thick film dielectric layer 16, the magnesium oxide or magnesium oxide containing layer 18, the phosphor thin film layer 20 and the upper thin film dielectric layer 23 may be referred to as a phosphor laminate.

The magnesium oxide or magnesium oxide containing layer 18 is provided with a thickness of about 20 nm to about 50 nm (and any range therebetween as is understood by one of skill in the art such as 21 nm to 49 nm, 25 nm to 45 nm, etc.)

and should be directly adjacent and in direct contact with the lower portion of the phosphor thin film layer 20 such that it is positioned between the phosphor thin film layer 20 and the thick film dielectric layer 16. The layer can be substantially of magnesium oxide or in aspects contain other elements as for example those contained in the adjacent phosphor film or other adjacent layers. As such, additional elements contained in the magnesium oxide containing layer may be for example, but not limited to, barium, aluminum and mixtures thereof.

Careful selection of the materials composition of the layers in contact with the magnesium oxide or magnesium oxide containing layer avoids dielectric breakdown and chemical or electrochemical reaction of the magnesium oxide or magnesium oxide containing layer with adjacent layers. The selection can be made by incorporating the magnesium or magnesium oxide-containing layer into a thin film laminate so that it is in contact with the proposed adjacent thin film layers, subjecting the laminate to the process conditions for fabricating a display device and then applying appropriate voltage waveforms across the device to determine the stability of the laminate under conditions anticipated within the device during operation. Such determination is readily done by one skilled in dielectric strength characterization and electrochemical characterization measurements.

The magnesium oxide or magnesium oxide containing layer 18 may be deposited using any suitable vacuum deposition methods that are compatible with the processes used to deposit and anneal the phosphor thin film layer 20. In aspects, the method may be sputtering using a magnesium oxide target using a low pressure argon sputtering atmosphere or reactive sputtering from a magnesium target conducted in a low pressure oxygen containing atmosphere.

A part of the function of the magnesium oxide or magnesium oxide-containing layer is to minimize migration of oxygen or water into the phosphor material during device operation that may react with the phosphor material to cause performance degradation. Phosphor degradation may involve reaction of oxygen or water with the phosphor material to change the chemical composition of at least a portion of the phosphor material. The magnesium oxide or magnesium oxide-containing layer may reduce the rate of these reactions by acting as a barrier for oxygen or water originating from within the thick dielectric structure of the device. The magnesium oxide or magnesium-oxide-containing layer may also serve to nucleate the crystal grains of the phosphor layer when it is deposited in a favourable manner to improve its stability or it may act as a stress relief layer between the dielectric structure and the phosphor layer to minimize stress in the phosphor layer. It may also act to inhibit electrochemical reactions at the phosphor interfaces during operation when there is an electric potential across the phosphor layer and current flow across the phosphor layer.

Further, the magnesium oxide or magnesium oxide-containing layer may act to minimize chemical reactions between the phosphor layer and the underlying dielectric structure during phosphor deposition or subsequent phosphor heat treatment steps, particularly with the use of phosphor films deposited by sputtering. Sputtering of phosphor films is advantageous for manufacture relative to electron-beam or thermal evaporation methods due to its ability to facilitate improved thickness and chemical composition uniformity over large area display substrates, but these advantages are realized at the cost of increased reactivity of the display substrate during the phosphor deposition process. Substrate reactivity is a concern with thick dielectric electroluminescent displays since the high dielectric constant materials used for the thick dielectric layer are reactive in the low pressure hydrogen sulfide-containing atmosphere typically used to deposit sulfide phosphor films, particularly those based on barium thioaluminate compounds such as are used to provide a primary blue electroluminescent emission for full colour electroluminescent displays such as those taught in U.S. Patent Application 2004/0090402 (hereby incorporated by reference in its entirety). The high dielectric constant materials used for thick dielectric layers comprise perovskite structure oxides that have a tendency to lose oxygen at high temperature, particularly in chemically reducing atmospheres as the low pressure atmospheres typically used for sputtering, especially in the presence of hydrogen sulfide. This loss of oxygen changes the crystal structure of the dielectric material, causing a reduction in its dielectric constant and increasing its chemical reactivity during subsequent process steps and during device operation due to the presence of dangling bonds from metal atoms in the material. During the sputtering process, the deposition substrate is impacted by high energy atoms and ions generated from the sputtering plasma that cause the dielectric material to lose oxygen in a manner similar to that as a result of high temperature. Without being bound by theory, this phenomenon may be responsible for an observed lower luminance stability during life testing of electroluminescent devices with sputtered phosphor films as compared to that for similar devices with evaporated phosphor films. Again, without being bound by theory the insertion of a magnesium oxide or magnesium oxide-containing layer between the phosphor and the underlying perovskite-containing dielectric layers may reduce the loss of oxygen from the perovskite structure materials, minimizing or preventing a reduction in their dielectric constant and increasing their chemical and electrochemical stability during subsequent process steps and during device operation.

The thioaluminate phosphor for use in the invention in conjunction with the magnesium oxide or magnesium oxide containing layer is of the form $AB_xC_{1+3x/2}$:RE where A is one or more of Mg, Ca, Sr or Ba and B is at least one of Al or In and C is at least one of S or Se and may include oxygen at a relative atomic concentration that is less than 0.2 of the combined S and Se concentrations. RE is one or more rare earth activator species that generate the required light spectrum and is in aspects selected from Eu or Ce. The value for x is chosen so that $2 \leq x \leq 4$. The phosphor film in aspects is selected from the group consisting of a europium activated barium thioaluminate wherein the ratio of aluminum to barium is between about 2 and 2.5, and in aspects between about 2.0 and 2.2. In other preferred aspects the ratio of aluminum to barium is between 2.5 and 4.0, in aspects between 3.0 and 4.0. In further aspects the phosphor composition further comprises magnesium with the ratio of the atomic concentration of magnesium to barium plus magnesium in the range of about 0.001 to about 0.2. In an aspect of the invention, the phosphor is $BaAl_2S_4$ activated with europium.

The present invention is particularly desirable for use in thick film dielectric electroluminescent displays where the thick dielectric structure comprises a lead magnesium niobate or lead magnesium niobate titanate (PNM or PNM-PT) sintered thick film layer with a smoothing layer of lead zirconate titanate (PZT) as taught in U.S. Pat. No. 5,432,015, and International Patent Applications WO00/70917 and WO03/056879 (the disclosures of which are hereby incorporated by reference).

In a first embodiment of the invention, shown in FIG. 1, a magnesium oxide or magnesium oxide containing layer 18 is provided within the display 10 directly adjacent the bottom side of the phosphor layer 20.

Figure 2:
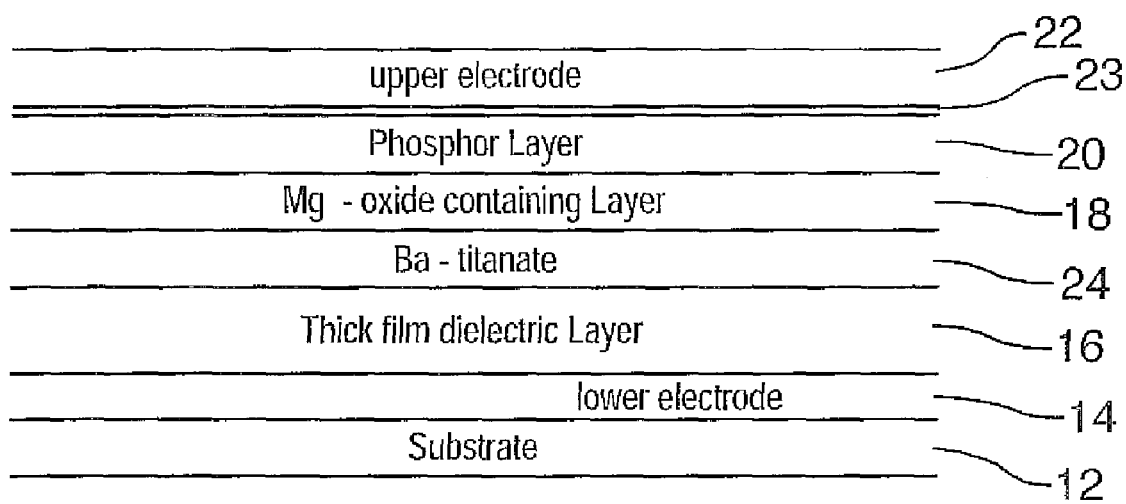
FIG. 2 shows a further embodiment of the device of FIG. 1.

A further embodiment of the invention is shown in FIG. 2 where a barium titanate layer 24 is provided in between the thick film dielectric layer 16 and the magnesium oxide or magnesium oxide containing layer 18. The layer of barium titanate may have a thickness of about 70 to 200 nm and in aspects about 100 to 170 nm. It is understood by one of skill in the art that the thickness of the barium titanate layer can be any range therebetween 70 to 200 nm.

Figure 3:
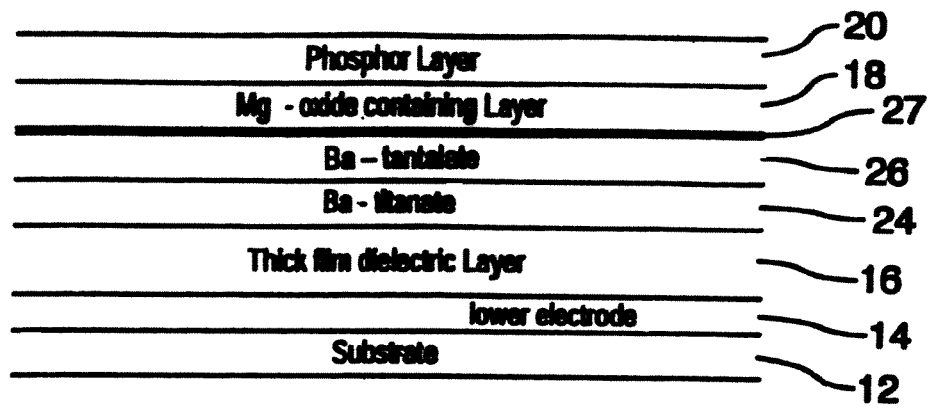
FIG. 3 shows a further embodiment of the device of FIG. 1.

A further embodiment of the invention is shown in FIG. 3 where a barium tantalate layer 26 is provided between the barium titanate layer 24 and the magnesium oxide or magnesium oxide containing layer 18. The barium tantalate layer 26 has a thickness in the range of about 30 to 70 nm. In this embodiment a layer of alumina 27 is provided between the barium tantalate and the magnesium oxide or magnesium oxide containing layer.

Figure 4:
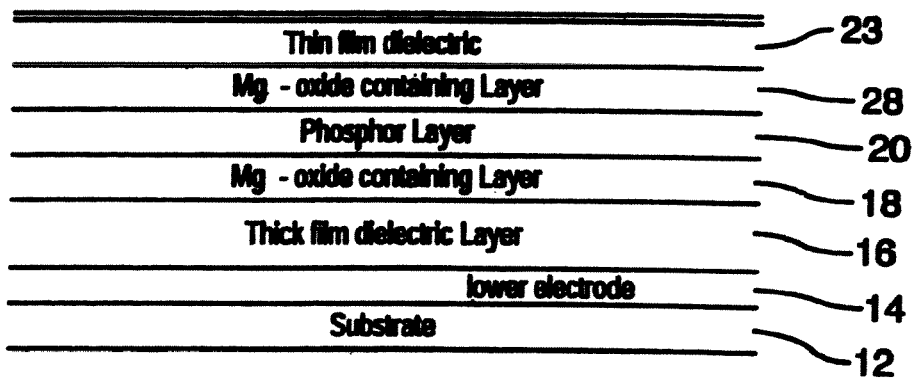
FIG. 4 shows a further embodiment of the device of FIG. 1.

A further embodiment of the invention is shown in FIG. 4 where a second magnesium oxide or magnesium oxide-containing layer 28 is positioned between the phosphor film 20 and the upper thin dielectric layer 23. It is understood by one of skill in the art that this second layer 28 is essentially the same as the first layer 18.

Figure 5:
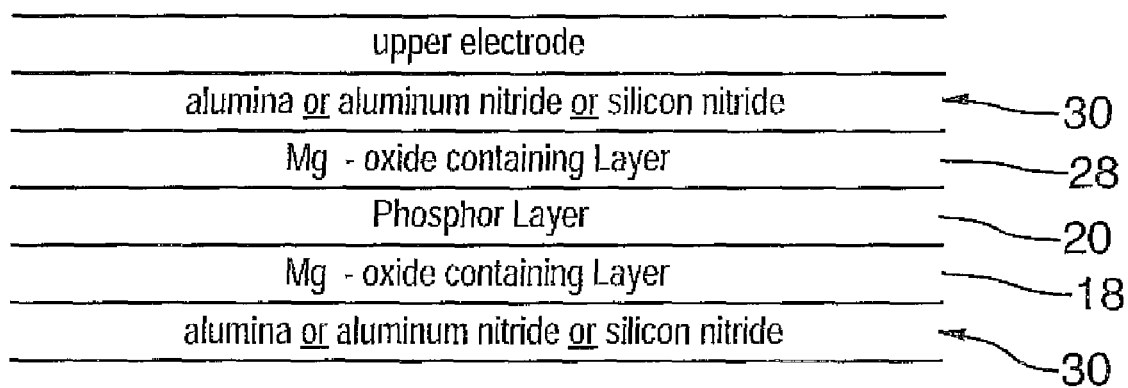
FIG. 5 shows a further embodiment of the device of FIG. 1.

A further embodiment of the invention is shown in FIG. 5 where a layer that is selected from the group consisting of alumina, aluminum nitride and silicon nitride layer 30 is provided that is in contact with the surface of at least one magnesium oxide or magnesium oxide-containing layer opposite the phosphor film. In this manner the device 10 may contain one or two layers 30 of alumina, aluminum nitride and/or silicon nitride. A barium tantalate layer 26 may also be provided between the barium titanate layer 24 and the alumina, aluminum nitride and silicon nitride layer 30.

It is understood by one of skill in the art that the device can be made in accordance with any of the embodiments described herein including combinations of the embodiments described herein and shown in the figures. For example, the device as shown in FIG. 1 can be fabricated to incorporate a layer of barium titanate 24, a layer of alumina, aluminum nitride or silicon nitride 30 and a second layer containing or being magnesium oxide 28.

The present invention is particularly directed towards improving the operating life of thick dielectric electroluminescent displays incorporating rare earth-activated alkaline earth thioaluminate phosphor materials, especially europium activated barium thioaluminate. While the detailed mechanism for stabilizing these phosphors is not understood, preventing oxygen or water from reacting with the phosphors may help ensure that the rare earth activator species remain dissolved in the crystal lattice of the host thioaluminate compounds. Reaction of the phosphor with oxygen or water may cause precipitation of aluminum oxide or aluminum hydroxide from the phosphor, causing the remaining material to become more barium rich. Stabilization of a particular crystal structure in the phosphor film may be dependent on minor deviations in the ratio of elements in the crystal structure from the stoichiometric ratio, which in turn is affected by exposure of the materials to oxygen or water that may originate from the processing atmosphere, or from the underlying dielectric structure.

The scope of the invention also includes methods used to deposit the magnesium oxide or magnesium oxide-containing layers of the invention. It extends to deposition processes for these materials that are carried out in a low pressure oxygen-containing atmosphere. Prior to deposition of the layers of the invention, it may be desirable to fully saturate the thick dielectric electroluminescent layers to stabilize them by ensuring that reduced metal species are not present. Examples of processes to deposit magnesium oxide are sputtering under an inert atmosphere from a magnesium oxide target or reactive sputtering of magnesium metal under an oxygen-containing atmosphere.

The following examples are provided to elucidate some of the preferred embodiments of the invention, but are not intended to be limiting in their scope.

EXAMPLE 1

This example serves to illustrate the performance and operating stability of devices of the prior art. A thick dielectric electroluminescent device incorporating thin film phosphor layers comprising barium thioaluminate activated with europium was constructed. The thick film substrate was comprised of a 5 cm by 5 cm glass having a thickness of 0.1 cm. A gold electrode was deposited on the substrate, followed with a lead magnesium niobate-titanate thick film high dielectric constant dielectric layer and a PZT smoothing layer in accordance with the methods exemplified in Applicant's co-pending International Patent Application WO 00/70917 filed May 12, 2000. A thin film dielectric layer consisting of barium titanate with a thickness of about 170 nanometers was deposited in accordance with the methods exemplified in U.S. Pat. No. 6,589,674 (the entirety of which is incorporated herein by reference). A second thin film layer consisting of barium tantalate with a thickness of 50 nanometers was deposited by a sputtering process on top of the barium titanate layer. A third thin film layer consisting of sputtered alumina with a thickness of 25 nanometers was deposited on the barium tantalate layer. A phosphor layer consisting of a 400 nanometer thick barium thioaluminate phosphor film activated with about 3 atomic percent of europium with respect to barium was deposited by electron beam evaporation onto the alumina layer according to the methods of U.S. patent application The phosphor had an atomic ratio of aluminum to barium of about 3.3 as measured by energy dispersive x-ray analysis (EDX) Following deposition the deposited phosphor was annealed in a belt furnace, first under air at a temperature of about 610 C for about 40 minutes and then under nitrogen at a temperature of about 720 C for 30 minutes Next a 50 nanometer thick aluminum nitride layer was sputter-deposited in accordance with the methods exemplified in U.S. Patent Application 2004/0170864, the entirety of which is incorporated herein by reference. Finally an indium tin oxide film was sputter deposited to form a second electrode on the device.

Figure 6:
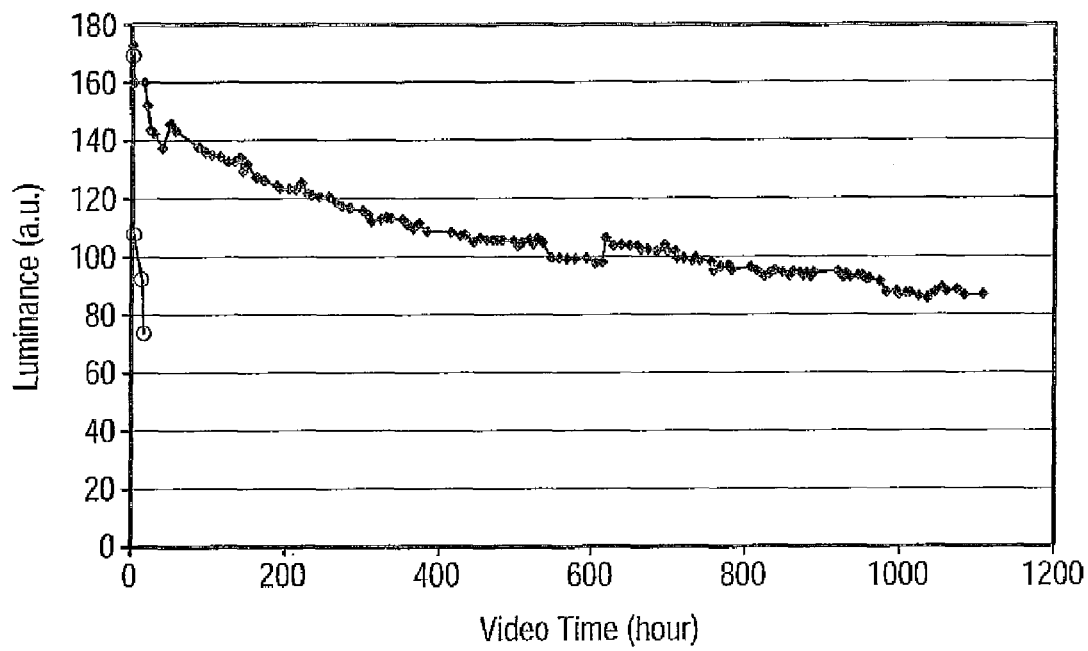
FIG. 6 shows a graph demonstrating the luminance as a function of operating time for two electroluminescent devices having a barium thioaluminate phosphor, one with an added magnesium oxide layer according to the present invention and the other without the magnesium oxide layer.

The device was tested by applying a 240 Hz alternating polarity square wave voltage waveform with a pulse width of 30 microseconds and an of amplitude 60 volts about the optical threshold voltage. FIG. 6 (open circles) shows the luminance as a function of operating time for the device. As can be seen from the data the initial luminance was about 169 candelas per square meter, but decreased very quickly in the first 20 hours to about 74 candelas per square meter.

EXAMPLE 2

This example serves to illustrate the benefit of the invention. A device was constructed similar to that of example 1, except that a 37 nanometer thick magnesium oxide layer was sputter deposited on top of the alumina layer prior to phosphor deposition. The luminance data for this device tested under the same conditions as for the device of example 1 is also shown in FIG. 6 (solid diamonds) and shows an initial luminance of about 173 candelas per square meter, followed by a slow rate of luminance loss. The luminance after 1100 hours of operation was still about 87 candelas per square meter.

EXAMPLE 3

Figure 7:
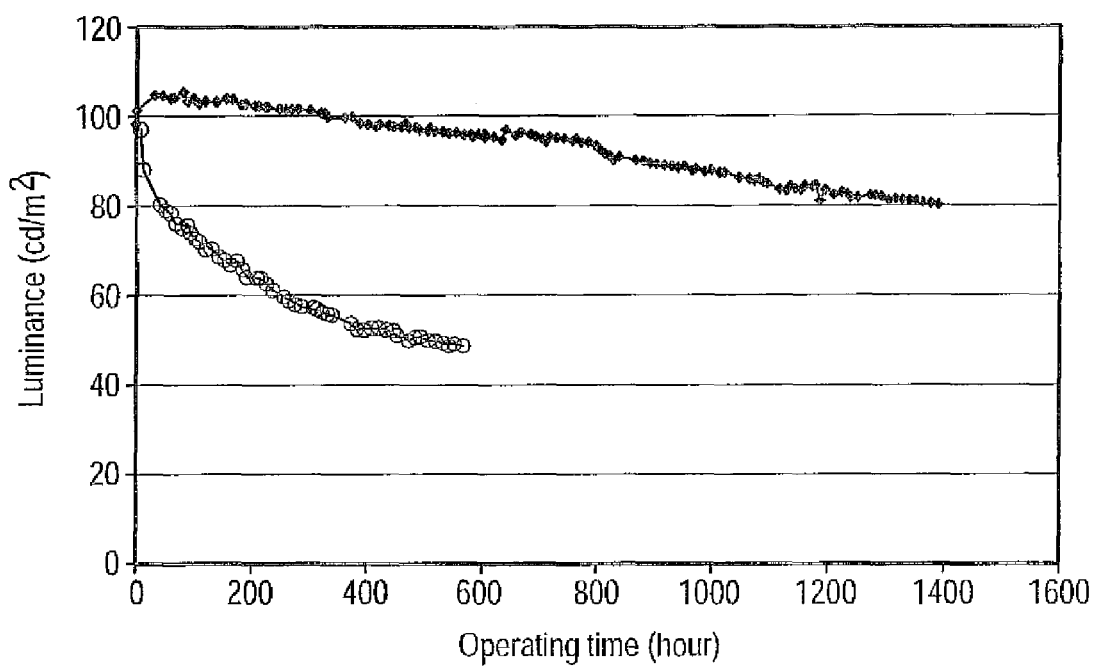
FIG. 7 is a graph demonstrating the luminance as a function of operating time for two electroluminescent devices having a barium thioaluminate phosphor with increased europium content, one with a magnesium oxide layer according to the present invention and the other without the magnesium oxide layer.

This example serves to illustrate the benefit of the invention to improve operating stability in an electroluminescent device with a different phosphor composition. FIG. 7 shows the luminance as a function of operating time for a device similar to that of example 2 except that it had a phosphor composition with a europium concentration of about 6 atomic percent of europium with respect to barium (open circles). FIG. 7 also shows the luminance as a function of operating time for a similar device with a 37 nanometer thick magnesium oxide layer between the alumina layer and the phosphor layer. The initial luminance of these two devices was very similar at about 100 candelas per square meter). The luminance of the device without the magnesium oxide layer dropped to 48 candelas per square meter after 570 hours of operation, while the luminance of the other device with the magnesium oxide layer was still above 80 candelas per square meter after 1400 hours of operation.

EXAMPLE 4

Figure 8:
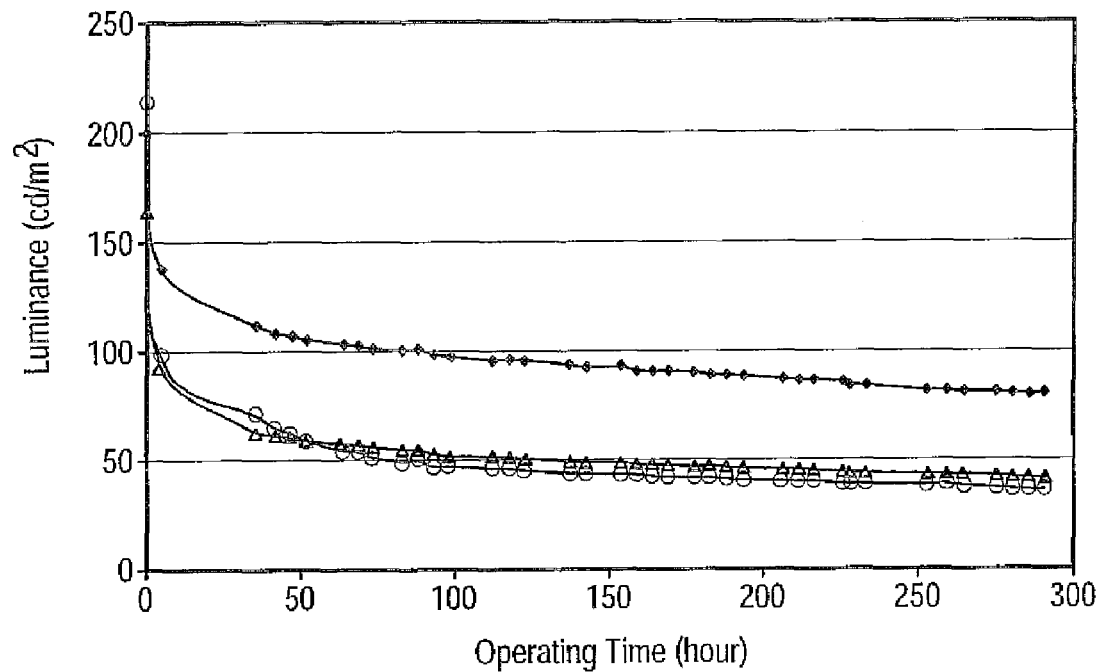
FIG. 8 is a graph demonstrating the luminance as a function of operating time for electroluminescent devices having a barium thioaluminate phosphor, and different combinations of thin film dielectric layers with the magnesium oxide layer of the present invention.

This example serves to show the effect of a magnesium oxide layer of the invention in a simplified device structure with different dielectric materials in contact with the magnesium oxide layer. A device similar to that of example 2 and example 3 was constructed, except that the alumina layer or both the alumina and barium tantalate layers were omitted from the structure of the device. The luminance data for the device without the alumina layer is shown by the open circles and for the device without the alumina and barium tantalate layers is shown by the solid diamonds in FIG. 8. As can be seen from the data, the luminance decreases much more slowly in the latter device, indicating that simply replacing the alumina layer with a magnesium oxide layer doesn't produce optimum results. The rate of luminance loss in this device is similar to that of the prior art device of Example 1. This result is illustrative of the need to place the magnesium oxide layer between other layers that are chemically compatible with it.

Figure 9:
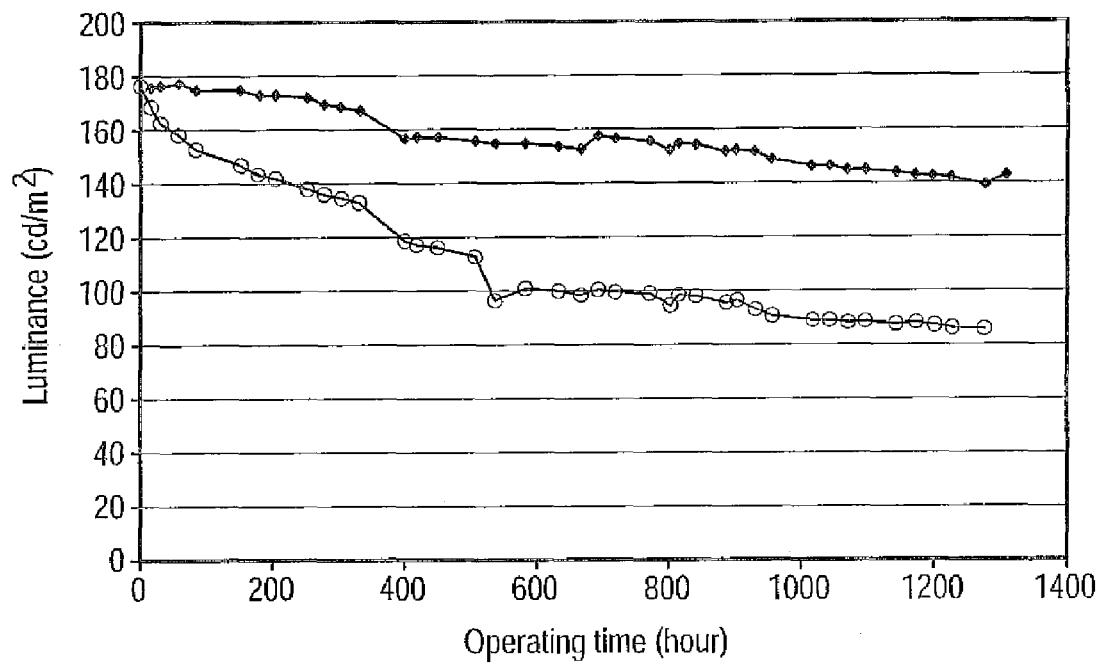
FIG. 9 is a graph demonstrating the luminance as a function of operating time for two electroluminescent devices, one having a barium thioaluminate phosphor, and only a magnesium oxide layer between the PZT smoothing layer of the thick film dielectric layer and the phosphor film and the other having the structure of the prior art.

FIG. 9 shows the stability comparison of an even simpler structure without barium titanate, barium tantalate and alumina layers between the thick dielectric structure and the phosphor layer. The solid circles represents the luminance as a function of operating time for a device having a magnesium oxide layer deposited directly on the PZT smoothing layer of the thick dielectric structure and for comparison the open circles represent the luminance as a function of operating time for the prior art device of example 1. The initial luminance for both devices is about 175 candelas per square meter, but the luminance for the prior art device decreased to 85 candelas per square meter after 1280 operating hours whereas the luminance for the simplified device with the magnesium oxide layer directly on top of the PZT smoothing layer was still above 140 candelas per square meter after 1300 hours of continuous operation. These results indicate that MgO has utility to stabilize device performance provided it is used in contact with layers that are chemically compatible with it.

What is claimed is:

1. A phosphor laminate for a thick dielectric film electroluminescent device, said laminate comprising:
    a rare earth activated alkaline earth thioaluminate phosphor thin film layer;
    a barrier layer consisting of magnesium oxide provided directly adjacent and in contact with a bottom of said phosphor thin film layer; and
    a thick film dielectric layer adjacent said magnesium oxide layer.

2. The laminate of claim 1, wherein said phosphor thin film layer is represented by $AB_xC_{1+3x/2}$:RE wherein
    A is at least one of Mg, Ca, Sr or Ba;
    B is at least one of Al or In;
    C is least one of S or Se;
    RE is one or more rare earth activator species; and
    $2 \leq x \leq 4$.

3. The laminate of claim 2, wherein RE is one or more rare earth activator species selected from the group consisting of Eu and Ce.

4. The laminate of claim 3, wherein said phosphor is barium thioaluminate with a ratio of aluminum to barium between about 2.0 to about 4.0.

5. The laminate of claim 4, wherein said ratio of aluminum to barium is between about 2.0 to about 2.2.

6. The laminate of claim 4, wherein said ratio of aluminum to barium is between about 3.0 to about 4.0.

7. The laminate of claim 3, wherein said phosphor is magnesium barium thioaluminate with a ratio of the atomic concentration of magnesium to barium plus magnesium is in the range of about 0.001 to 0.2.

8. The laminate of claim 3, wherein said phosphor additionally comprises oxygen at a relative atomic concentration that is less than 0.2 of the combined S and Se concentrations.

9. The laminate of claim 1, wherein said magnesium oxide layer has a thickness of about 20 nm to about 50 nm.

10. The laminate of claim 1, wherein said magnesium oxide layer is adhered to the phosphor thin film structure.

11. The laminate of claim 1, wherein said magnesium oxide layer is deposited by a vacuum deposition process.

12. The laminate of claim 11, wherein said vacuum deposition process is sputtering.

13. The laminate of claim 12, wherein a magnesium oxide target is used in sputtering.

14. The laminate of claim 12, wherein sputtering is conducted in a low pressure oxygen-containing atmosphere.

15. The laminate of claim 12, wherein sputtering is conducted in a low pressure argon atmosphere.

16. The laminate of claim 4, wherein said thick film dielectric layer comprises a bottom layer of lead magnesium niobate (PMN) or lead magnesium niobate titanate (PMN-PT) and a top layer of lead zirconate titanate (PZT) as a smoothing layer.

17. The laminate of claim 16, wherein a layer of barium titanate is provided on top of said smoothing layer.

18. The laminate of claim 17, wherein said laminate further comprises a layer of barium tantalate on said barium titanate layer and a layer of alumina on top of said barium tantalate layer, said alumina layer being directly adjacent to said magnesium oxide layer.

19. The laminate of claim 17, wherein said layer of barium titanate has a thickness of about 70 nm to about 200 nm.

20. The laminate of claim 18, wherein said layer of barium tantalate has a thickness of about 30 nm to about 70 nm.

21. The laminate of claim 1, wherein a layer selected from the group consisting of alumina, aluminum nitride and silicon nitride is provided in contact with a surface of the magnesium oxide layer that is not in contact with said phosphor layer.

22. The laminate of claim 1, wherein a second magnesium oxide layer is provided on a top of said phosphor film.

23. A phosphor laminate for a thick dielectric film electroluminescent device, said laminate comprising:
- a rare earth activated barium thioaluminate phosphor thin film layer;
- a barrier layer consisting of magnesium oxide provided directly adjacent and in contact with a bottom of said phosphor thin film layer; and
- a thick film dielectric layer adjacent said magnesium oxide layer.

24. A thick film dielectric electroluminescent device comprising:
- a thioaluminate phosphor;
- a barrier layer consisting of magnesium oxide directly adjacent a bottom surface of the phosphor; and
- a thick film dielectric layer adjacent said layer of magnesium oxide layer.

25. The device of claim 24, wherein said thioaluminate phosphor is represented by $AB_xC_{y1+3x/2}$:RE wherein
- A is at least one of Mg, Ca, Sr or Ba;
- B is at least one of Al or In;
- C is least one of S or Se;
- RE is one or more rare earth activator species; and
- $2 \leq x \leq 4$.

26. The device of claim 25, wherein RE is one or more rare earth activator species selected from the group consisting of Eu and Ce.

27. The device of claim 26, wherein said phosphor is barium thioaluminate with a ratio of aluminum to barium between about 2.0 to about 4.0.

28. The device of claim 26, wherein said ratio of aluminum to barium is between about 2.0 to about 2.2.

29. The device of claim 26, wherein said ratio of aluminum to barium is between about 3.0 to about 4.0.

30. The device of claim 26, wherein said phosphor is magnesium barium thioaluminate with a ratio of the atomic concentration of magnesium to barium plus magnesium is in the range of about 0.001 to 0.2.

31. The device of claim 24, wherein said phosphor additionally comprises oxygen at a relative atomic concentration that is less than 0.2 of the combined S and Se concentrations.

32. The device of claim 24, wherein said magnesium oxide layer has a thickness of about 20 nm to about 50 nm.

33. The device of claim 24, wherein said magnesium oxide layer is adhered to the phosphor thin film structure.

34. The device of claim 24, wherein said magnesium oxide layer is deposited by a vacuum deposition process.

35. The device of claim 34, wherein said vacuum deposition process is sputtering.

36. The device of claim 35, wherein a magnesium oxide target is used in sputtering.

37. The device of claim 36, wherein sputtering is conducted in a low pressure oxygen-containing atmosphere.

38. The device of claim 36, wherein sputtering is conducted in a low pressure argon atmosphere.

39. The device of claim 24, wherein said thick film dielectric layer comprises a bottom layer of lead magnesium niobate (PMN) or lead magnesium niobate titanate (PMN-PT) and a top layer of lead zirconate titanate (PZT) as a smoothing layer.

40. The device of claim 39, wherein a layer of barium titanate is provided on top of said smoothing layer.

41. The device of claim 40, wherein said laminate further comprises a layer of barium tantalate on said barium titanate layer and a layer of alumina on top of said barium tantalate layer, said alumina layer being directly adjacent to said magnesium oxide layer.

42. The device of claim 40, wherein said layer of barium titanate has a thickness of about 70 nm to about 200 nm.

43. The device of claim 41, wherein said layer of barium tantalate has a thickness of about 30 nm to about 70 nm.

44. The device of claim 24, wherein a layer selected from the group consisting of alumina, aluminum nitride and silicon nitride is provided with a surface of the magnesium oxide or magnesium oxide containing layer that is not in contact with said phosphor layer.

45. The laminate of claim 24, wherein a second magnesium oxide layer is provided on a top of said phosphor film.

46. A method for improving the luminance and operating life of an alkaline earth thioaluminate phosphor doped with a rare earth activator species in a thick film dielectric electroluminescent device, the method comprising:
providing the laminate of claim 1 within said device.

47. A phosphor laminate for a thick dielectric film electroluminescent device, said laminate comprising:
- a rare earth activated alkaline earth thioaluminate phosphor thin film layer;
- a barrier layer consisting of magnesium oxide provided directly adjacent and in contact with a bottom of said phosphor thin film layer and having a thickness of about 20 nm to about 50 nm; and
- a thick film dielectric layer adjacent said magnesium oxide layer comprising a bottom layer of lead magnesium niobate (PMN) or lead magnesium niobate titanate (PMN-PT) and a top layer of lead zirconate titanate (PZT) as a smoothing layer.

* * * * *